(12) United States Patent
Stallman et al.

(10) Patent No.: US 12,141,444 B2
(45) Date of Patent: Nov. 12, 2024

(54) MIRRORED DISAGGREGATED MEMORY IN A CLUSTERED ENVIRONMENT

(71) Applicant: International Business Machines Corporation, Armonk, NY (US)

(72) Inventors: Adam Thomas Stallman, Rochester, MN (US); Suresh Guduru, Telangana (IN); Ryan K. Cradick, Oronoco, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

(21) Appl. No.: 18/066,447

(22) Filed: Dec. 15, 2022

(65) Prior Publication Data
US 2024/0201861 A1  Jun. 20, 2024

(51) Int. Cl.
*G06F 3/06* (2006.01)

(52) U.S. Cl.
CPC .......... *G06F 3/0614* (2013.01); *G06F 3/0629* (2013.01); *G06F 3/0673* (2013.01)

(58) Field of Classification Search
CPC ..... G06F 3/0673; G06F 3/0614; G06F 3/0629
USPC ........................................................ 711/154
See application file for complete search history.

(56) References Cited

U.S. PATENT DOCUMENTS

| | | |
|---|---|---|
| 8,010,829 B1 | 8/2011 | Chatterjee et al. |
| 9,262,225 B2 | 2/2016 | Davis et al. |
| 9,996,440 B2 | 6/2018 | Ganesan et al. |
| 10,129,169 B2 | 11/2018 | Mahindru et al. |
| 2018/0024964 A1* | 1/2018 | Mao ...................... G06F 3/0655 711/173 |

(Continued)

OTHER PUBLICATIONS

Anselmi, et al, "IBM Power S1014, S1022s, S1022, and S1024 Technical Overview and Introduction", https://www.redbooks.ibm.com/redpapers/pdfs/redp5675.pdf, (Retrieved: Feb. 14, 2024), 2022, 200 pages.

(Continued)

*Primary Examiner* — Hua J Song
(74) *Attorney, Agent, or Firm* — Cantor Colburn LLP; Edward Wixted

(57) ABSTRACT

An example computer-implemented method for mirroring memory in a disaggregated memory clustered environment is provided. The method includes assigning, by a hypervisor, a disaggregated memory to a virtual machine comprising a remote disaggregated memory, the virtual machine being one node of a cluster of the disaggregated memory clustered environment. The method further includes allocating, by a disaggregated memory manager, a mirrored memory for the remote disaggregated memory to mirror the remote disaggregated memory on an alternate node of the cluster of the disaggregated memory clustered environment. The method further includes responsive to a memory access occurring, maintaining, by the disaggregated memory manager, the mirrored memory. The method further includes, responsive to detecting a memory allocation adjustment, modifying, by the disaggregated memory manager, memory usage across the cluster. The method further includes, responsive to detecting a failure resulting in loss of access to the remote disaggregated memory, implementing a corrective action.

25 Claims, 9 Drawing Sheets

(56) References Cited

U.S. PATENT DOCUMENTS

2019/0370118 A1 12/2019 Salapura et al.
2020/0169607 A1* 5/2020 Enz .................... H04L 67/1097
2021/0075633 A1 3/2021 Sen et al.

OTHER PUBLICATIONS

Bielski, et al, "dReDBox: Materializing a Full-stack Rack-scale System Prototype of a Next-Generation Disaggregated Datacenter", UTC IEEE Xplore, 2024, pp. 1093-1098.

Carbonari, et al, "Tolerating Faults in Disaggregated Datacenters", Association for Computing Machinery (ACM), 2017, 7 pages.

Cruickshank, et al, IBM Power System E980 Technical Overview and Introduction, https://www.redbooks.ibm.com/redpapers/pdfs/redp5510.pdf, (Retrieved: Feb. 14, 2024), 2018, 184 pages.

Gopalan, et al, "Multi-Hypervisor Virtual Machines: Enabling An Ecosystem of Hypervisor-level Services", https://www.usenix.org/system/files/conference/atc17/atc17-gopalan.pdf, (Retrieved: Feb. 15, 2024), 37 pages.

International Search Report and Written Opinion for International Application No. PCT/EP2023/084099; International Filing Date: Dec. 4, 2023; Date of Mailing: Mar. 4, 2024; 18 pages.

Kyriakidis, "A Full System Simulator for Disaggregated Computing Platforms and Cloud Data Centers", https://dias.library.tuc.gr/view/manf/69000, (Retrieved: Feb. 14, 2024), Thesis, Technical University of Crete, 2017, 62 pages.

Liu, et al, "Memory Disaggregation: Research Problems and Opportunities", IEEE 39th International Conference on Distributed Computing Systems (ICDCS), 2019, pp. 1664-1673.

Pinto, et al, "ThymesisFlow: A Software-Defined, HW/SW co-Designed Interconnect Stack for Rack-Scale Memory Disaggregation", IEEE, 2020, pp. 868-880.

Saljoghei, et al, "dRedDbox: Demonstrating Disaggregated Memory in an Optical Data Centre", UTC IEEE Xplore, 2018, 3 pages.

Volos, "The Case for Replication-Aware Memory-Error Protection in Disaggregated Memory", arXiv preprint, 2023, 4 pages.

Starke et al.; "IBM's POWER10 Processor"; Hot Chips 32; Aug. 16-18, 2020; 43 Pages.

Pinto et al.; "Teleporting Memory Across Two Servers"; IBM Reasearch Blog; Retrieved Online from https://www.ibm.com/blogs/research/2020/08/teleporting-memory-across-two-servers/; Aug. 18, 2020; 9 Pages.

* cited by examiner

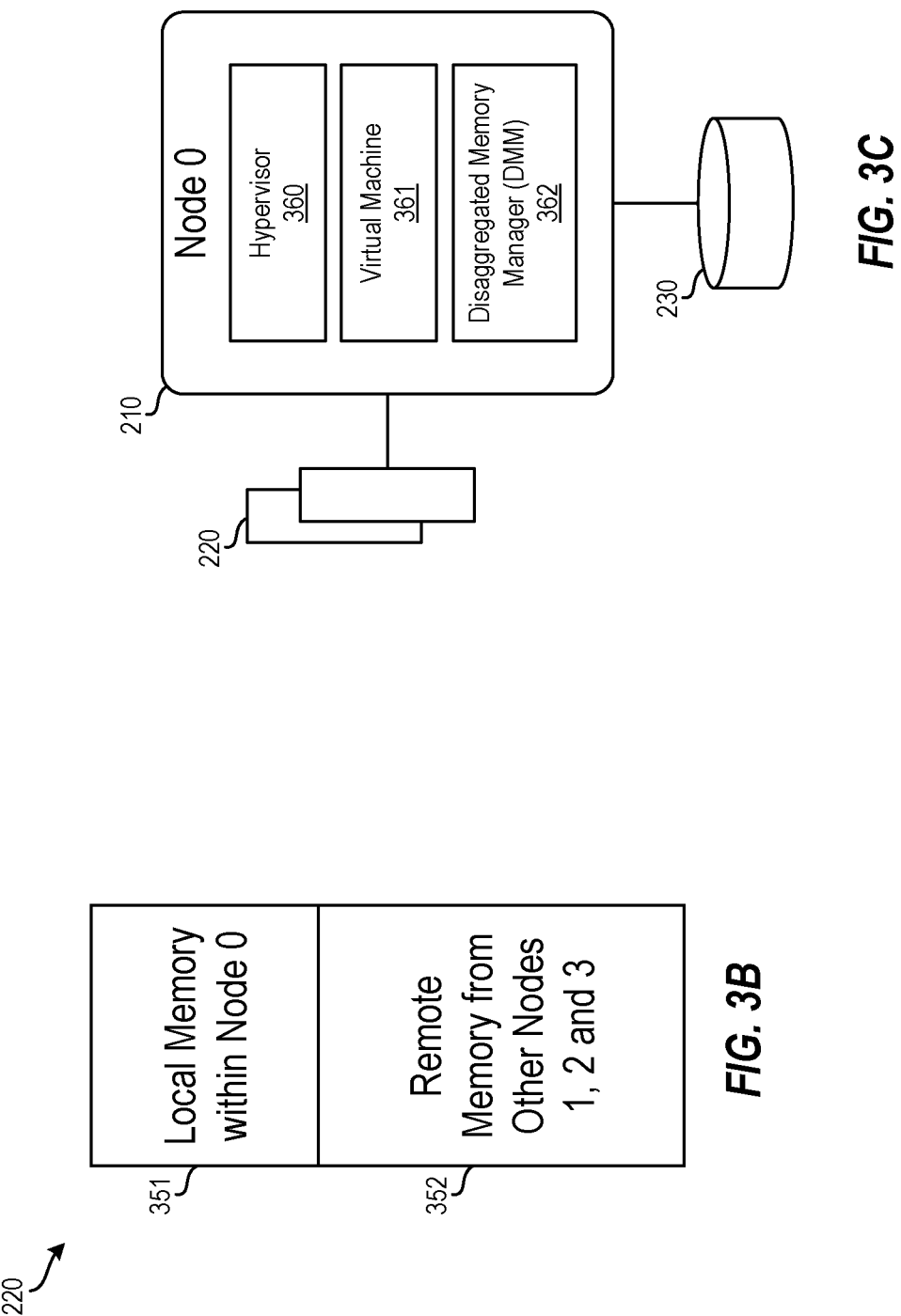

MIRRORED DISAGGREGATED MEMORY IN A CLUSTERED ENVIRONMENT

BACKGROUND

Embodiments described herein generally relate to computer processing systems, and more specifically, to computer processing systems that implement mirrored disaggregated memory in a clustered environment.

Cloud computing and cloud storage provides users with capabilities to store and process their data in third-party data centers. Cloud computing facilitates the ability to provision a virtual machine for a customer quickly and easily, without requiring the customer to purchase hardware or to provide floor space for a physical server. In general, a virtual machine, running as a guest under the control of a host hypervisor, relies on that hypervisor to transparently provide virtualization services for that guest. These services include memory management, instruction emulation, and interruption processing.

The term "hypervisor" refers to a processing environment or platform service that manages and permits one or more virtual machines to execute using multiple (and sometimes different) operating systems on a same host machine. It should be appreciated that deploying a virtual machines includes an installation process of the virtual machines and an activation (or starting) process of the virtual machines. In another example, deploying a virtual machines includes an activation (or starting) process of the virtual machines (e.g., in case the virtual machine is previously installed or already exists).

Some computer processing systems (or simply "processing systems"), such as nodes of cloud computing systems, include the ability to dynamically share memory across multiple processing systems over a dedicated network fabric. A processor chip in one processing system can be directly cabled to a processor chip in another processing system, linking those processing systems together and enabling them to share each other's physical memory. This functionality is known as "memory inception," "memory disaggregation," or "memory clustering." This technology can be used for multiple use cases, including within composable data centers where resources, including memory, may be dynamically allocate and shared across systems.

SUMMARY

In one exemplary embodiment, an example computer-implemented method for mirroring memory in a disaggregated memory clustered environment is provided. The method includes assigning, by a hypervisor, a disaggregated memory to a virtual machine comprising a remote disaggregated memory, the virtual machine being one node of a cluster of the disaggregated memory clustered environment. The method further includes allocating, by a disaggregated memory manager, a mirrored memory for the remote disaggregated memory to mirror the remote disaggregated memory on an alternate node of the cluster of the disaggregated memory clustered environment. The method further includes responsive to a memory access occurring, maintaining, by the disaggregated memory manager, the mirrored memory. The method further includes, responsive to detecting a memory allocation adjustment, modifying, by the disaggregated memory manager, memory usage across the cluster. The method further includes, responsive to detecting a failure resulting in loss of access to the remote disaggregated memory, implementing a corrective action. The method improves resiliency and/or performance of the cluster and/or the node. Moreover, the method improves the functioning of the cluster by providing mirrored memory. For example, the method provides for preventing catastrophic memory loss and for improving reliability and availability within a disaggregated memory environment without losing the advantages of being able to utilize disaggregated memory.

In another exemplary embodiment, a system is provided that includes a memory having computer readable instructions and a processing device for executing the computer readable instructions. The computer readable instructions control the processing device to perform operations for mirroring memory in a disaggregated memory clustered environment. The operations include assigning, by a hypervisor, a disaggregated memory to a virtual machine comprising a remote disaggregated memory, the virtual machine being one node of a cluster of the disaggregated memory clustered environment. The operations further include allocating, by a disaggregated memory manager, a mirrored memory for the remote disaggregated memory to mirror the remote disaggregated memory on an alternate node of the cluster of the disaggregated memory clustered environment. The operations further include responsive to a memory access occurring, maintaining, by the disaggregated memory manager, the mirrored memory. The operations further include, responsive to detecting a memory allocation adjustment, modifying, by the disaggregated memory manager, memory usage across the cluster. The operations further include, responsive to detecting a failure resulting in loss of access to the remote disaggregated memory, implementing a corrective action. The system improves resiliency and/or performance of the cluster and/or the node. Moreover, the system improves the functioning of the cluster by providing mirrored memory. For example, the system provides for preventing catastrophic memory loss and for improving reliability and availability within a disaggregated memory environment without losing the advantages of being able to utilize disaggregated memory.

In another exemplary embodiment, a computer program product is provided that includes a computer readable storage medium having program instructions embodied therewith, the program instructions executable by a processor to cause the processor to perform operations for mirroring memory in a disaggregated memory clustered environment. The operations include assigning, by a hypervisor, a disaggregated memory to a virtual machine comprising a remote disaggregated memory, the virtual machine being one node of a cluster of the disaggregated memory clustered environment. The operations further include allocating, by a disaggregated memory manager, a mirrored memory for the remote disaggregated memory to mirror the remote disaggregated memory on an alternate node of the cluster of the disaggregated memory clustered environment. The operations further include responsive to a memory access occurring, maintaining, by the disaggregated memory manager, the mirrored memory. The operations further include, responsive to detecting a memory allocation adjustment, modifying, by the disaggregated memory manager, memory usage across the cluster. The operations further include, responsive to detecting a failure resulting in loss of access to the remote disaggregated memory, implementing a corrective action. The computer program product improves resiliency and/or performance of the cluster and/or the node. Moreover, the computer program product improves the functioning of the cluster by providing mirrored memory. For example, the computer program product provides for preventing catastrophic memory loss and for improving reliability and availability within a disaggregated memory environment without losing the advantages of being able to utilize disaggregated memory.

In another exemplary embodiment, a computer-implemented is provided for mirroring memory in a disaggregated memory clustered environment. The method includes, assigning, by a hypervisor, a disaggregated memory to a virtual machine of a cluster. The method further includes allocating, by a disaggregated memory manager, a mirrored memory for remote disaggregated memory allocations. The method further includes maintaining, by the disaggregated memory manager, the mirrored memory as memory accesses occur. The method further includes, responsive to memory allocation adjustments, adjusting, by the disaggregated memory manager, the allocations to maintain mirroring. The method further includes, responsive to changes to the cluster, determining, by the disaggregated memory manager, whether allocation changes are to be made for improved performance and resiliency and adjusting the allocations accordingly. The method further includes determining that a failure occurs in a primary node of the disaggregated memory. The method further includes, responsive to determining that the failure occurred in the primary node, switching to using a secondary node as a primary memory source and re-establishing an alternate secondary node for the mirrored memory. The method improves resiliency and/or performance of the cluster and/or the node. Moreover, the method improves the functioning of the cluster by providing mirrored memory. For example, the method provides for preventing catastrophic memory loss and for improving reliability and availability within a disaggregated memory environment without losing the advantages of being able to utilize disaggregated memory.

In another exemplary embodiment, a system is provided that includes a memory having computer readable instructions and a processing device for executing the computer readable instructions. The computer readable instructions control the processing device to perform operations for mirroring memory in a disaggregated memory clustered environment. The operations include assigning, by a hypervisor, a disaggregated memory to a virtual machine of a cluster. The operations further include allocating, by a disaggregated memory manager, a mirrored memory for remote disaggregated memory allocations. The operations further include maintaining, by the disaggregated memory manager, the mirrored memory as memory accesses occur. The operations further include, responsive to memory allocation adjustments, adjusting, by the disaggregated memory manager, the allocations to maintain mirroring. The operations further include, responsive to changes to the cluster, determining, by the disaggregated memory manager, whether allocation changes are to be made for improved performance and resiliency and adjusting the allocations accordingly. The operations further include determining that a failure occurs in a primary node of the disaggregated memory. The operations further include, responsive to determining that the failure occurred in the primary node, switching to using a secondary node as a primary memory source and re-establishing an alternate secondary node for the mirrored memory. The system improves resiliency and/or performance of the cluster and/or the node. Moreover, the system improves the functioning of the cluster by providing mirrored memory. For example, the system provides for preventing catastrophic memory loss and for improving reliability and availability within a disaggregated memory environment without losing the advantages of being able to utilize disaggregated memory.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3B depicts a memory for one of the nodes of the cluster of FIG. 3A according to one or more embodiments described herein;

FIG. 3C depicts one of the nodes of FIGS. 2 and 3A according to one or more embodiments described herein;

Figure 1:
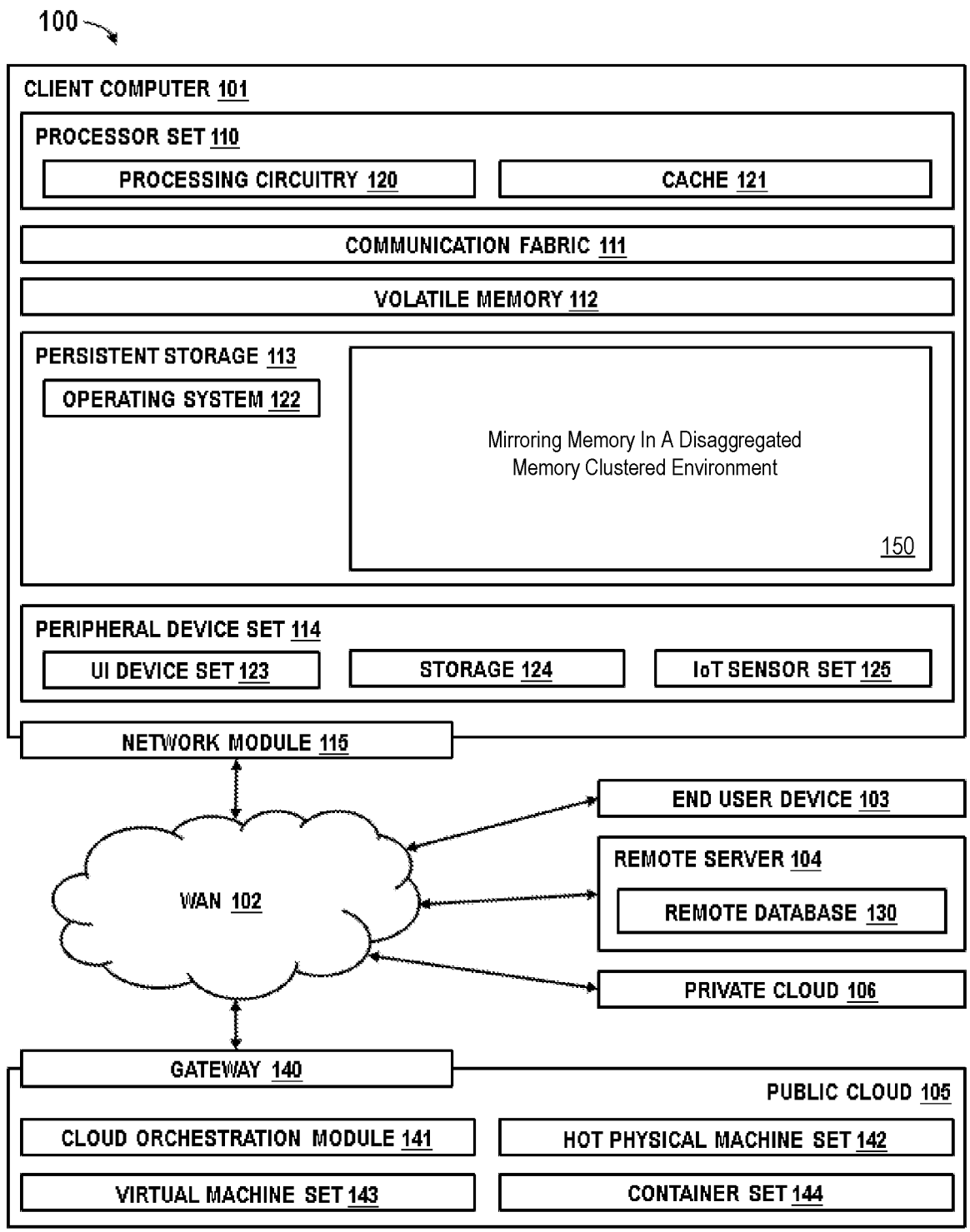
FIG. 1 depicts a block diagram of a processing system for implementing one or more embodiments described herein.

The diagrams depicted herein are illustrative. There can be many variations to the diagram or the operations described therein without departing from the scope of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All these variations are considered a part of the specification.

DETAILED DESCRIPTION

One or more embodiments of the described herein provide mirrored disaggregated memory in a clustered environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in each flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as mirroring memory in a disaggregated memory clustered environment 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments of the described herein provide mirrored disaggregated memory in a clustered environment. As described herein, disaggregated memory is the ability to dynamically share memory across multiple processing systems over a dedicated network fabric or any other mechanism of interfaces that can provide the sharing of memory. The use of disaggregated memory within a clustered environment may decrease the reliability and availability of a remote disaggregated memory compared to a local memory due to additional cabling, connections, distances, and systems involved in such a configuration. If an operating system or virtual machine is utilizing disaggregated memory, which is on a remote system, and the memory becomes unavailable, it may be as catastrophic to the workload as losing all of the memory due to the potential for both local and remote memory to be presented to the virtual memory as a contiguous block.

Several contemporary approaches have attempted to address issues relating to disaggregated memory within a clustered environment but are insufficient. For example, one contemporary approach is to utilize only local memory for assignment to the virtual machine. However, this approach removes the advantages of utilizing disaggregated memory in a clustered environment. Another contemporary approach is to only use disaggregated memory for specific volumes of memory for which loss of access may be tolerable. However, this approach requires undesirable configuration and management overhead. Yet another contemporary approach is to accept/tolerate the reduced reliability and reduced availability introduced by the additional complexity of a disaggregated memory environment. However, this approach is unacceptable in many environments.

One or more embodiments are provided to address these and other shortcomings by providing for mirroring remote disaggregated memory within a disaggregated memory environment to another node in a cluster that is accessible from the system hosting the virtual machine. According to an embodiment, the mirroring can be accomplished using a unique physical path to provide redundancy for failure events in the physical path. If a failure occurs within the cluster such that the virtual machine's disaggregated memory is no longer available to the virtual machine, the unique path and replica of the memory can automatically be utilized to allow for the failure in the cluster to be tolerated.

Figure 2:
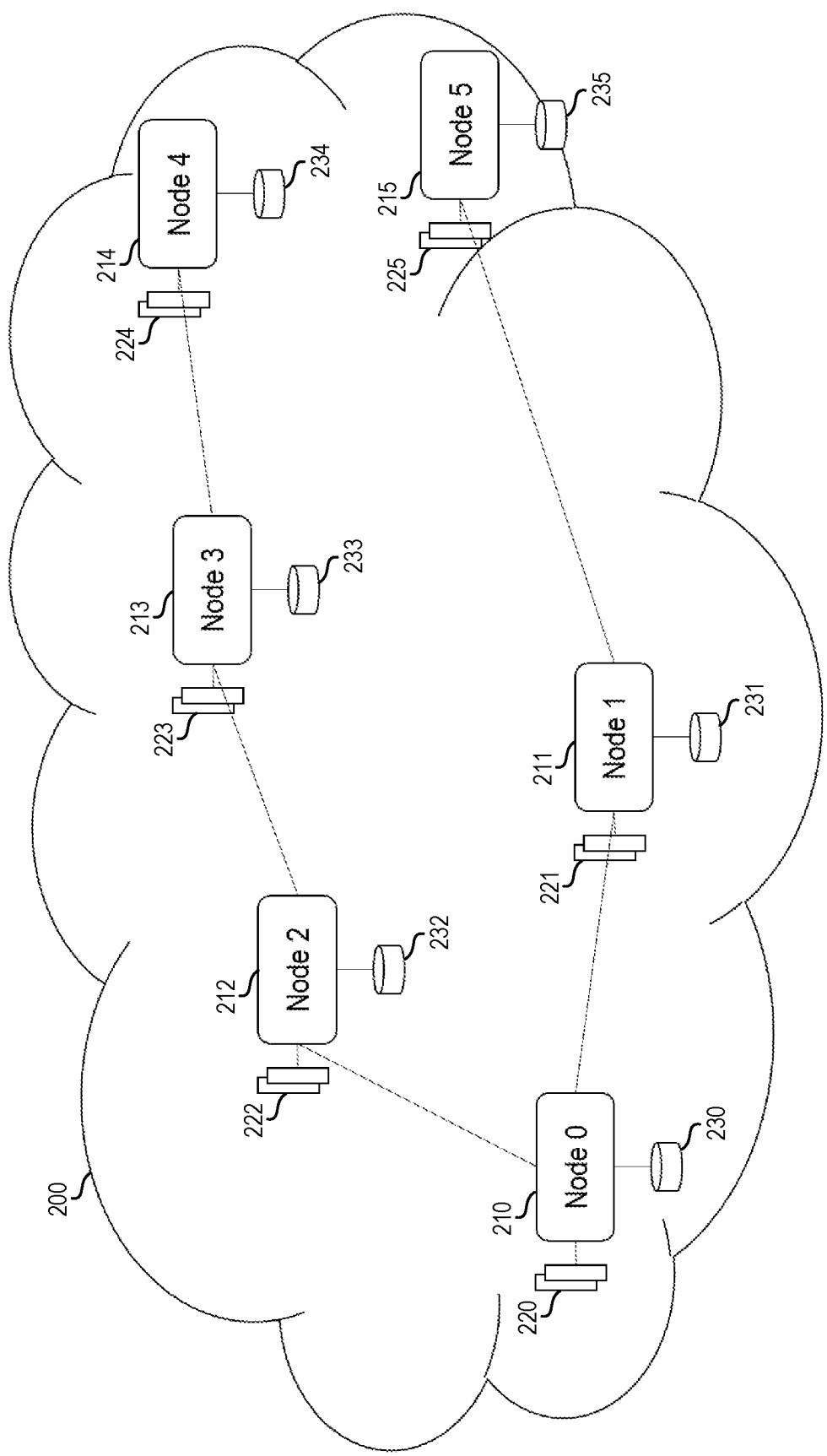
FIG. 2 depicts a hybrid cloud with nodes in clusters is depicted according to one or more embodiments described herein.

Turning now to FIG. 2, a hybrid cloud 200 with nodes 210-215 in clusters is depicted according to one or more embodiments described herein. In particular, the hybrid cloud 200 includes nodes 210, 211, 212, 213, 214, 215. Each of the nodes includes a memory and a storage device. For example, the node 210 includes a memory 220 and a storage device 230, the node 211 includes a memory 221 and a storage device 231, the node 212 includes a memory 222 and a storage device 232, the node 213 includes a memory 223 and a storage device 233, the node 214 includes a memory 224 and a storage device 234, and the node 215 includes a memory 225 and a storage device 235. It should be appreciated that each node 210-215 can include multiple memories and/or multiple storage devices.

Figure 3A:
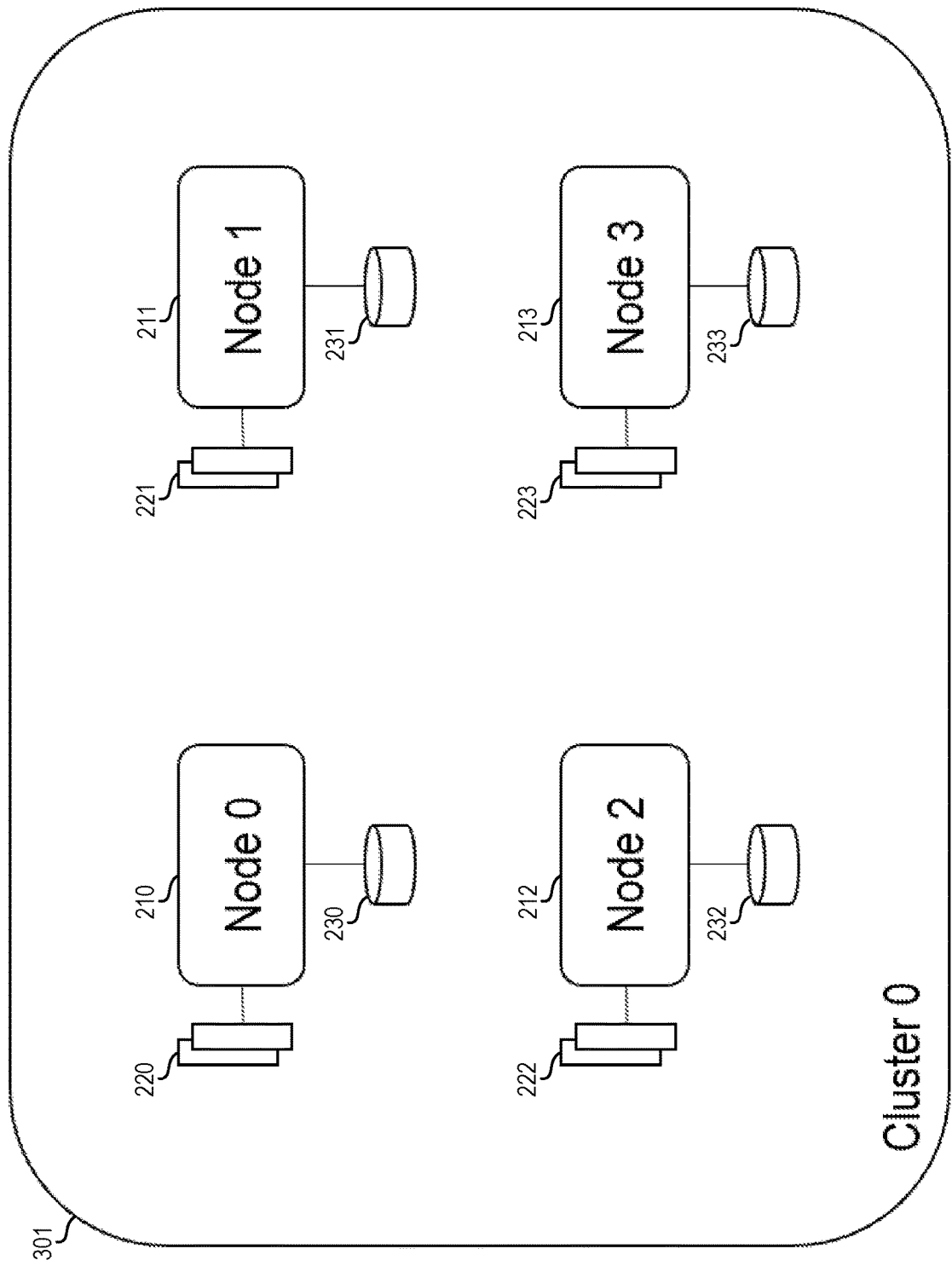
FIG. 3A depicts a cluster for memory servers in the hybrid cloud of FIG. 2 according to one or more embodiments described herein.

FIG. 3A depicts a cluster 301 for memory servers in the hybrid cloud 200 according to one or more embodiments described herein. Like in FIG. 2, each of the nodes 210-213 includes a memory and a storage device. Each of the memories 220-223 for the nodes 210-213 can include a local memory portion and a remote memory portion, as shown in FIG. 3B. As an example, FIG. 3B depicts the memory 220 for the node 210 of the cluster 301 according to one or more embodiments described herein. The memory 220 includes a local memory portion 351 and a remote memory portion 352. The local memory portion 351 is a local memory for the node 210 (e.g., "node 0"). The remote memory portion 352 is a remote memory from other nodes of the cluster 301 including the nodes 211, 212, 213 (e.g., "node 1," "node 2," and "node 3"). This provides a disaggregated memory in a clustered environment.

Each of the nodes 210-213 can be a requester node that can request data stored in memory of one or more of the other nodes. For example, the node 210 can be a requester node and can request data stored in memory on one or more of the nodes 211, 212, 213. The requestor node can have an identifier "Cx:Ny:Mz" where "C" is the cluster," "N" is the node, and "M" is the memory of the node. In the case of node 210 being the requester node, the node 210 can be identified as "cluster 310:node 210:memory222." The method that is used to locate a memory block may not be limited to the above format of memory addressing of a memory block or unit, but can also include various ways of addressing a memory block or unit in a clustered environment.

FIG. 3C depicts the node 210 of FIGS. 2 and 3A according to one or more embodiments described herein. As shown, the node 210 includes the memory 220 and the storage device 230. The node 210 also includes a hypervisor 360, a virtual machine 361, and a disaggregated memory manager (DMM) 362. The hypervisor 360 manages and permits one or more virtual machines (e.g., the virtual machine 361) to execute using multiple (and sometimes different) operating systems on the same host machine (e.g., the node 210). The DMM 362 facilitates mirrored disaggregated memory in a clustered environment as is further described herein with reference to FIGS. 4, 5, and 6A-6C.

Figure 4:
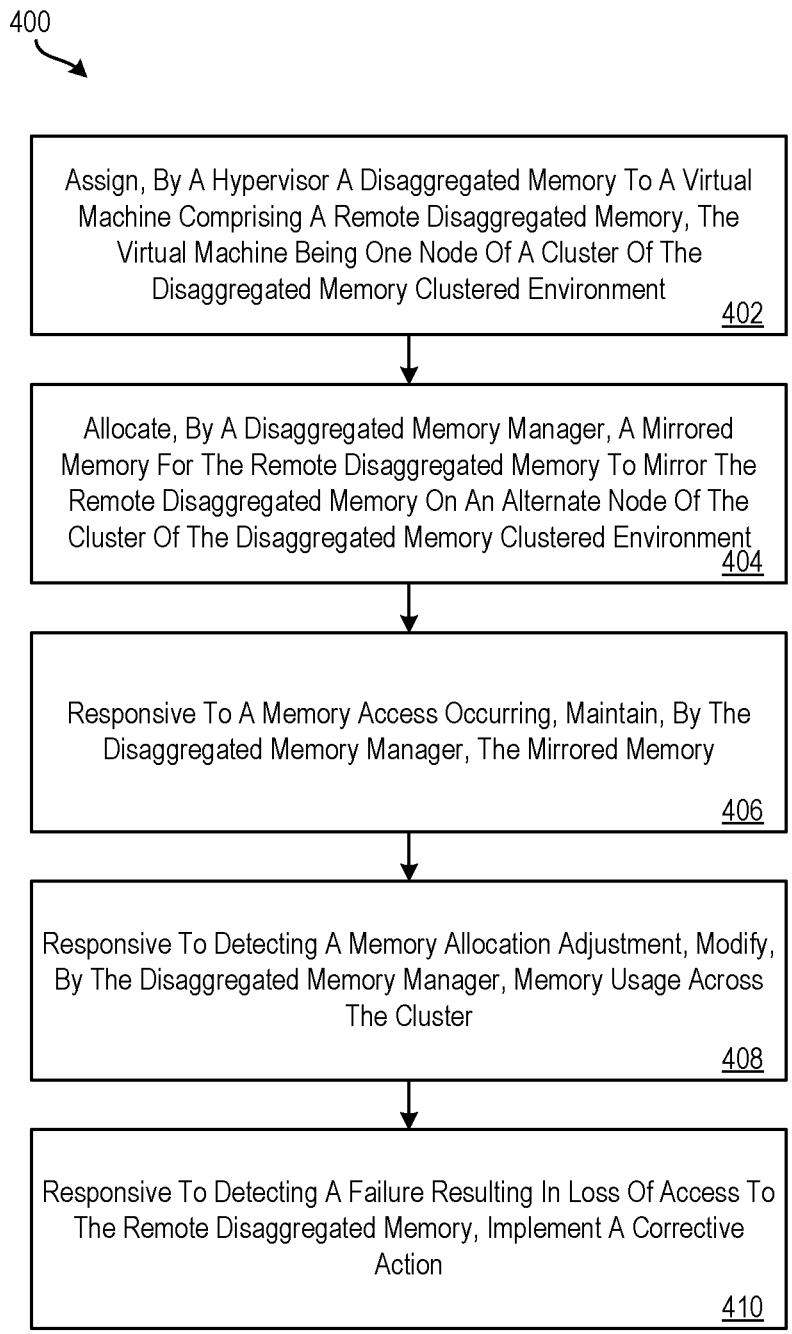
FIG. 4 depicts a flow diagram of a method for mirrored disaggregated memory in a clustered environment according to one or more embodiments described herein.

FIG. 4 depicts a flow diagram of a method 400 for mirrored disaggregated memory in a clustered environment according to one or more embodiments described herein. The method 400 can be implemented using any suitable system or device, such as the computing environment 100, one or more of the nodes 210-215, and/or the like, including combinations and/or multiples thereof. For example, the method 400 can be implemented using the node 210, including the hypervisor 360, the virtual machine 361, and the DMM 362, as shown in FIG. 3C.

At block 402, the hypervisor 360 assigns a disaggregated memory to the virtual machine 361 comprising a remote disaggregated memory (e.g., the remote memory portion 352 of the memory 220). The virtual machine 361 is contained within one node of a cluster (e.g., the cluster 301) of the disaggregated memory clustered environment. According to one or more embodiments described herein, the virtual machine 361 further includes a local memory (e.g., the local memory portion 351 of the memory 220).

At block 404, the DMM 362 allocates a mirrored memory for the remote disaggregated memory to mirror the remote disaggregated memory on an alternate node (e.g., one of the nodes 211-213) of the cluster (e.g., the cluster 301) of the disaggregated memory clustered environment. The alternate node can be accessible through an independent path.

At block 406, responsive to a memory access occurring, the DMM 362 maintains the mirrored memory. For example, as memory accesses are made the DMM 362 ensures memory writes are made to both the primary and alternate blocks of memory on unique nodes of the cluster 301.

At block 408, responsive to detecting a memory allocation adjustment, the DMM 362 modifies memory usage across the cluster. For example, as memory allocation adjustments are made by the hypervisor 360, the DMM 362 can modify the memory usage of the virtual machine 361 across the cluster 301 to maintain the mirror of the remote allocation of memory in the cluster 301. According to an example, as configuration changes are made within the cluster 301 (e.g., removing nodes, adding nodes, and/or the like, including combinations and/or multiples thereof), the DMM 362 can respond to these changes by adjusting memory distribution/allocations. This improves resiliency and/or performance of the cluster 301 and/or the node 210.

At block 410, responsive to detecting a failure resulting in loss of access to the remote disaggregated memory, a corrective action can be implemented. The corrective action is selected to improve processing system performance, such as improving resilience and/or performance of the cluster 301. For example, in the event of a failure that results in a loss of access to the remote disaggregated memory, the DMM 362 can respond to the failure within the cluster 301, such as to select a new secondary node to provide mirroring, thereby improving the functioning of the processing system (e.g., the cluster 301) by providing mirrored memory.

Further, the method 400 improves the performance of the nodes 210-213 of the cluster 301 by providing improved reliability and availability within a disaggregated memory environment without losing the advantages of being able to utilize disaggregated memory.

Additional processes also may be included, and it should be understood that the process depicted in FIG. 4 represents an illustration, and that other processes may be added or existing processes may be removed, modified, or rearranged without departing from the scope of the present disclosure.

Figure 5:
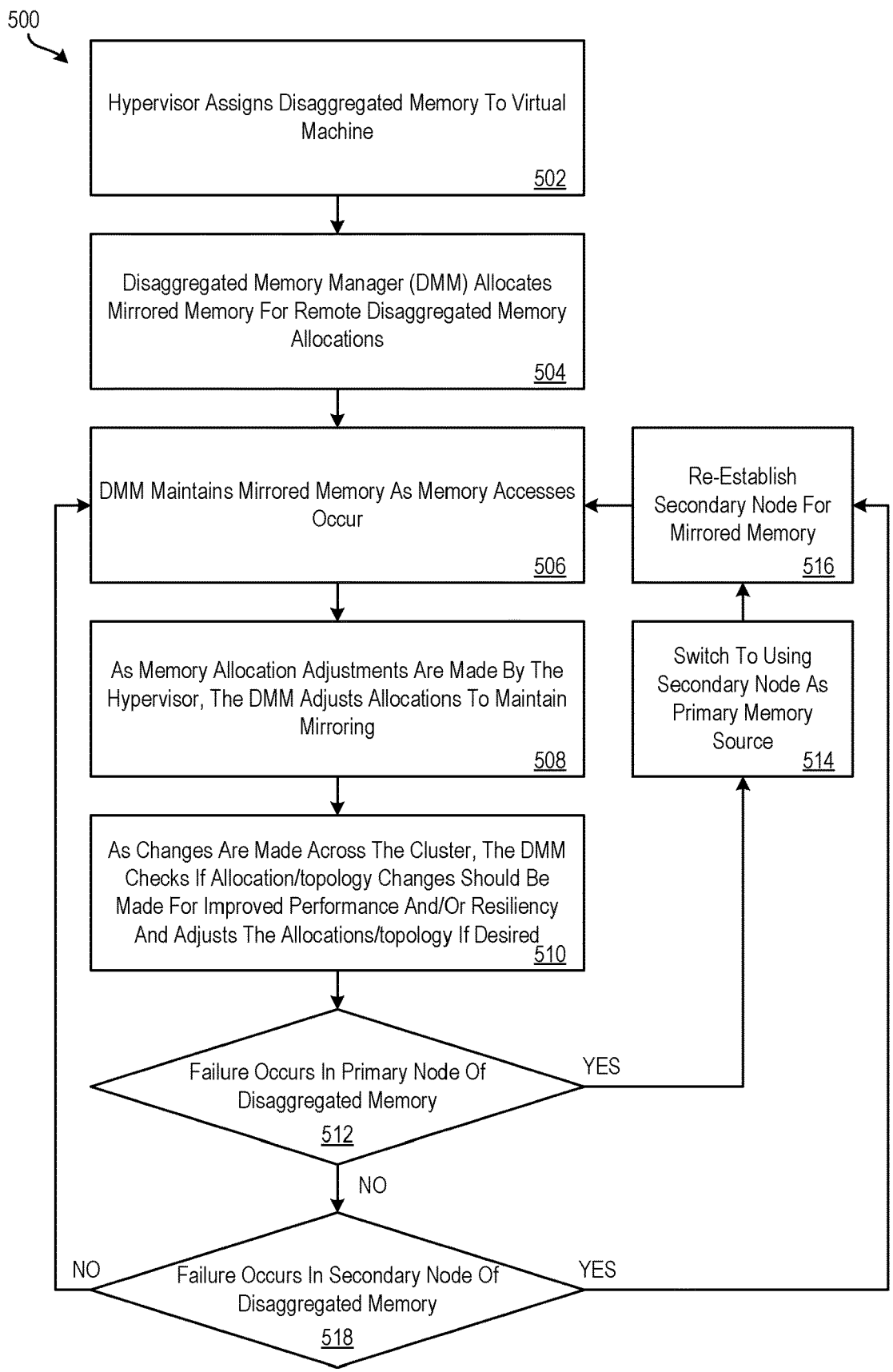
FIG. 5 depicts a flow diagram of a method for mirrored disaggregated memory in a clustered environment according to one or more embodiments described herein.

FIG. 5 depicts a flow diagram of a method 500 for mirrored disaggregated memory in a clustered environment according to one or more embodiments described herein. The method 500 can be implemented using any suitable system or device, such as the computing environment 100, one or more of the nodes 210-215, and/or the like, including combinations and/or multiples thereof. For example, the method 500 can be implemented using the node 210, including the hypervisor 360, the virtual machine 361, and the DMM 362, as shown in FIG. 3C.

At block 502, the hypervisor 360 assigns a disaggregated memory to the virtual machine 361. This can be done either as a configuration decision by a user or as a memory usage optimization approach with disaggregated memory assigned from across a cluster of nodes by the virtual machine 361. According to an embodiment, the virtual machine 361 includes both local and remote disaggregated memory (see, e.g., FIG. 3B). This combination of local and remote disaggregated memory may be presented as a single contiguous block of memory within a virtual address space to an operating system.

At block 504, the DMM 362 allocates mirrored memory for remote disaggregated memory allocations. For example, the DMM 362 also allocates memory to mirror the remote disaggregated memory on an alternate node (e.g., one or more of the nodes 211-214) in the cluster 301 that is accessible through a physical independent path. The DMM can have knowledge of various characteristics of the cluster 301, such as: the capacities of nodes in the cluster (e.g., overall memory capacity, free memory available), the topology of the cluster (e.g., physical layout of nodes and connections between nodes), the connection state between nodes (e.g., link speed may vary depending on cabling or connectors, error or degraded states), the power usage of cluster nodes (e.g., the nodes 210-213) and power usage goals of the data center, the location and characteristics of other DMMs in the cluster (e.g., location, current memory usage), and/or the like, including combinations and/or multiples thereof. The DMM 362 can utilize this knowledge to optimize the selection of mirrored remote aggregated memory. Examples of how the DMM 362 may use the characteristics of the cluster include: the capabilities of nodes 210-213 in the cluster 301 may be used to select nodes with sufficient memory capacity, the topology of the customer may be used to achieve the goal of having independent physical paths to memory nodes for redundancy or to minimize data transfer distances, the connection state between the nodes may be used to select error-free connections or connections trained at a higher bandwidth, the power usage of cluster nodes and power usage goals of the data center may be used to optimally select backup nodes to help to achieve power usage goals by consolidating usage to allow nodes to be powered off, the location and characteristics of other DMMs in the cluster may be used to optimally select backup nodes which may allow other DMMs to achieve their own goals, and/or the like, including combinations and/or multiples thereof.

At block 506, the DMM 362 maintains mirrored memory as memory accesses occur. For example, as memory accesses occur, the DMM 362 ensures the memory writes are made to both the primary and alternate blocks of memory on unique nodes of the cluster 301. Various techniques of maintaining the consistency of memory across the primary and alternate memory may be utilized. One example is that writes to memory are only considered complete when both copies of the memory have completed the operation. However, other techniques, such as caching or journaling of changes, may be utilized to ensure coherency to the desired level of assurance.

At block 508, the DMM 362 adjusts allocations to maintain mirroring as memory allocation adjustments are made by the hypervisor 360. For example, as memory allocation adjustments are made by the hypervisor 360, the DMM 362 can modify the memory of the virtual machine 361 usage across the cluster 301 to maintain the mirror of the remote allocation of memory in the cluster 301. These adjustments may involve changes such as if a segment of memory is relocated from the local system to the disaggregate primary node, the DMM 362 can allocate and mirror the memory to the alternate node. As another example, if additional remote memory allocations are made, either new memory allocations on alternate remote nodes will be established or the entirety of remote memory may be allocated to a new remote node. As another example, characteristics of the disaggregated memory cluster usage can be used to optimize usage of disaggregated memory within the cluster 301.

At block 510, as changes are made across the cluster 301, the DMM 362 checks if allocation/topology changes should be made for improved performance and/or resiliency and adjusts the allocations/topology if desired. For example, as configuration changes are made within the cluster 301 (e.g., removing nodes, adding nodes), the DMM 362 can respond to these changes to adjust memory distribution/allocations for improved resiliency and/or performance. According to an embodiment, if a node is to be removed, the DMM 362 can select alternate node(s) to host the memory that is currently used as the primary source or the mirrored backup. A controlled node removal could allow for a new mirror to be established before the node is removed to eliminate an exposure where no redundancy is available. According to an embodiment, if a node is added to the cluster 301, the DMM 362 may re-evaluate the network to determine if the new node may be utilized to improve the resiliency and/or performance of the memory topology. Redundancy may be improved if the addition of the node provides for a unique physical path to the primary and backup mirror of disaggregated memory. Performance may be improved if the addition of the node allows for a short path (e.g., fewer hops, shorted distance) or utilization of higher bandwidth links to the primary and backup mirror of disaggregated memory.

At block 512, it is determined whether a failure occurs in a primary node (e.g., the node 210) of the disaggregated memory. If it is determined that a failure has occurred in the primary node, the method 500 proceeds to block 514. For example, in the event of a failure which results in loss of access to the remote disaggregate memory is determined to have occurred, the DMM 362 can respond to the failure within the cluster 301. If the failure occurs in the primary node, the DMM 362, at block 514, can switch to utilizing the alternate node disaggregated memory allowing for the virtual machine to continue to run without interruption from the local memory while re-establishing the mirror. This will become the primary memory node and a new alternate mirrored memory allocation can be established at block 516. If it is determined that no failure has occurred in the primary node at block 512, the method 500 proceeds to block 518, where it is determined whether a failure occurs in a secondary node (e.g., one or more of the nodes 211-213). For example, if the failure occurs in a secondary node as determined at block 518, the DMM 362 can find an alternative secondary node in the cluster 301 as the mirror for the disaggregated memory at block 516, and/or the DMM 362 can wait for the failed memory to be accessible and then re-establish the mirror. Until the memory is recovered, the virtual machine may be running without memory redundancy of the remote disaggregated memory. If it is determined that no failure has occurred in the secondary node at block 518, the method 500 proceeds to block 506, and the method 500 at least partially repeats.

Additional processes also may be included, such as the following. For example, one or more embodiments may provide for remotely mirroring the local memory allocations utilized by the virtual machine 361 which could be managed by the DMM 362 in a similar manner to the remote memory allocations as previously described. This could provide extra resiliency by providing a mirror for the local memory and utilize the logic of the DMM 362 to dynamically select optimal nodes for providing the mirrored data.

One or more embodiments may utilize multiple nodes (e.g., multiple of the nodes 211-213) in the cluster 301 to provide the complete mirror for the disaggregate memory in the primary node (e.g., the node 210). This may be done if there not a single node that has the capacity to provide a full mirror of the disaggregate memory.

One or more embodiments may use knowledge of "hot" memory accesses to automatically move memory allocations between local and remote memory within the cluster 301. Keeping frequency accessed memory local provides improved performance and may not require mirroring.

According to one or more embodiments, as an alternative to directly mapping the redundant copy of remote disaggregated memory to an alternate node as described herein, the DMM 362 can utilize various memory management strategies involving spreading the redundant data across multiple nodes or an alternative memory management approach to provide redundancy of the data.

One or more embodiments may use alternative data protection algorithms in such ways as to utilize known RAID algorithms to spread data across multiple nodes or even establish multiple mirrors of the data.

It should be understood that the process depicted in FIG. 5 represents an illustration, and that other processes may be added or existing processes may be removed, modified, or rearranged without departing from the scope of the present disclosure.

Figure 6A:
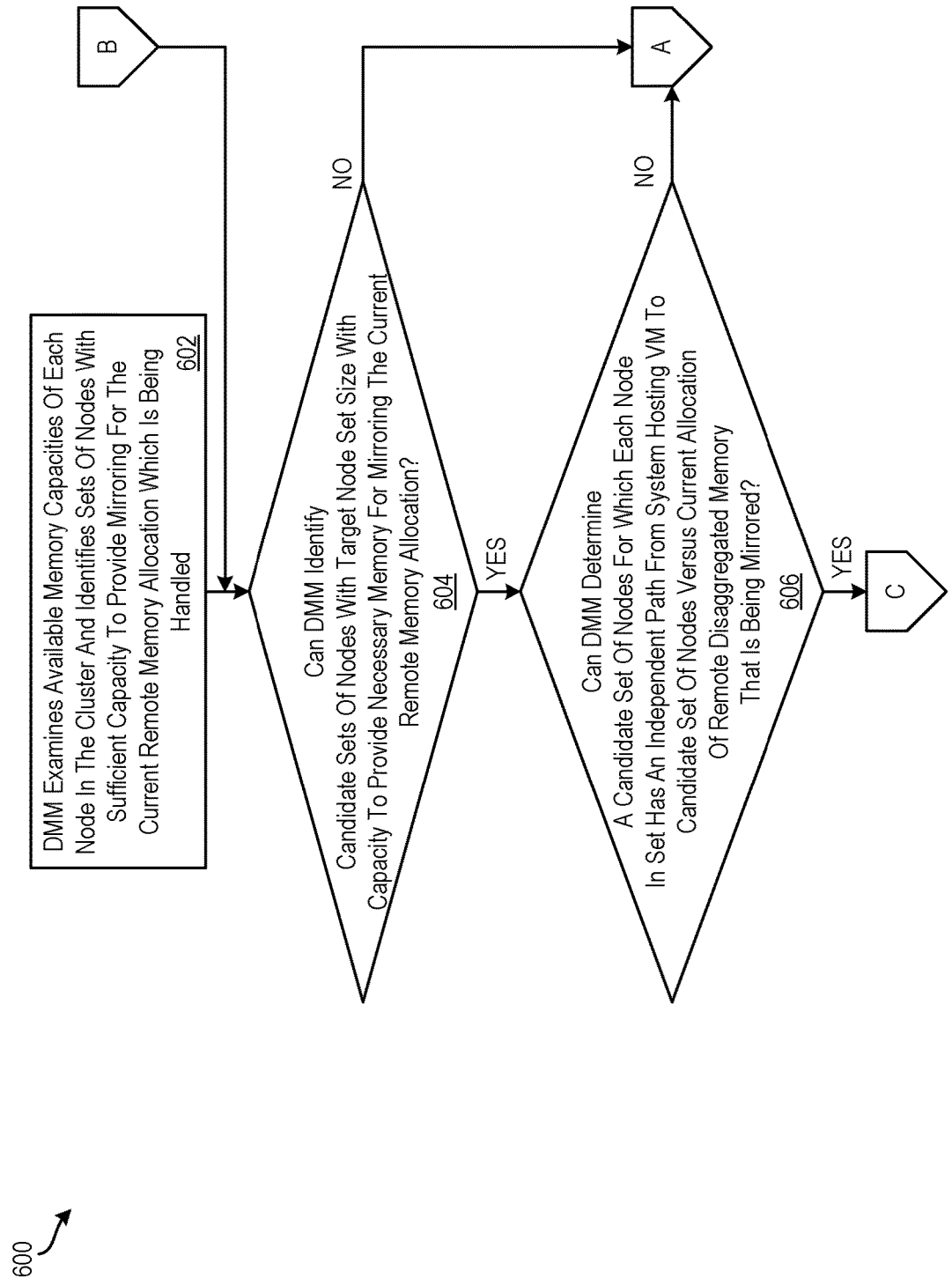
FIGS. 6A-6C together depict a flow diagram of a method for mirrored disaggregated memory in a clustered environment according to one or more embodiments described herein.
Figure 6B:
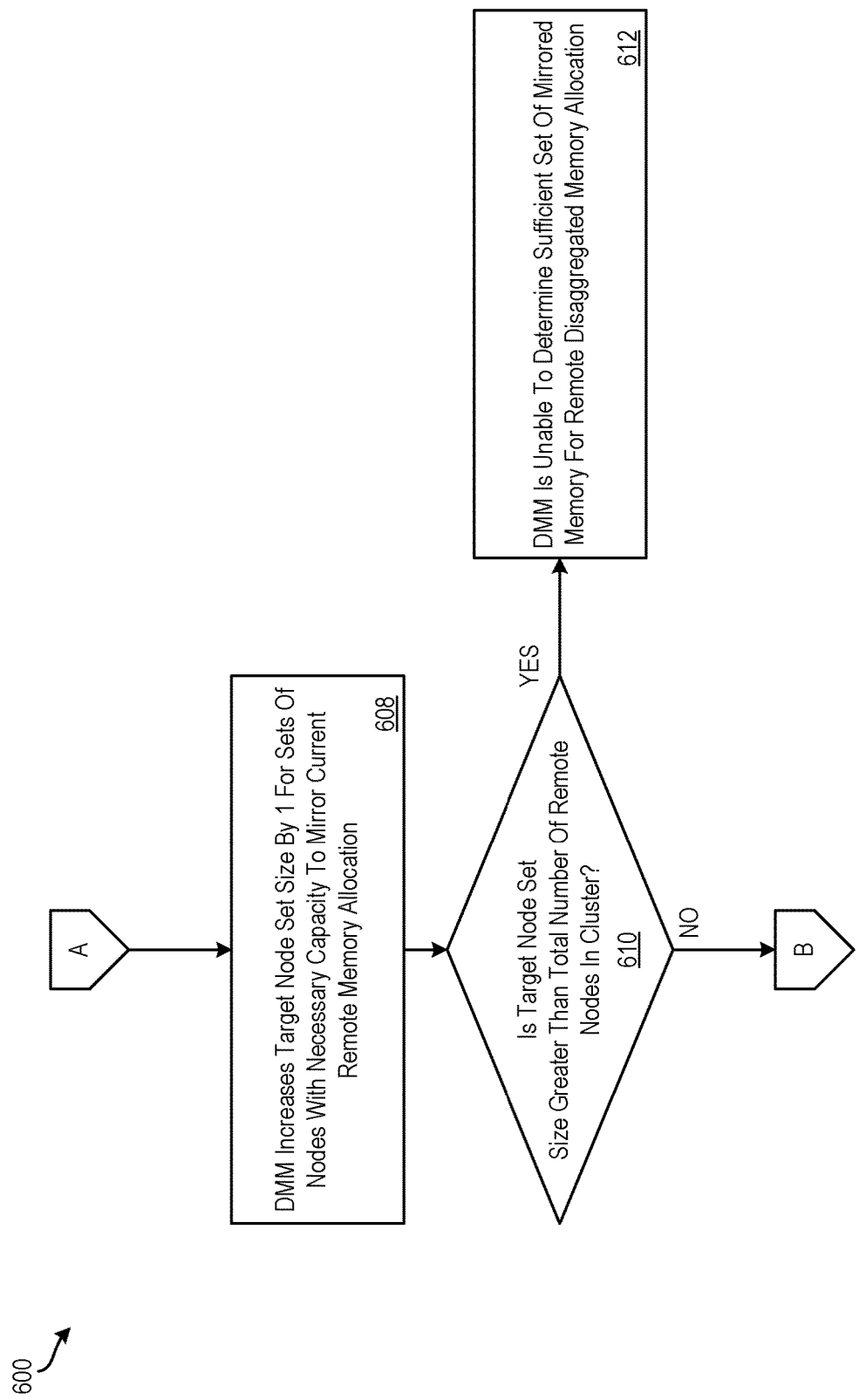
Figure 6C:
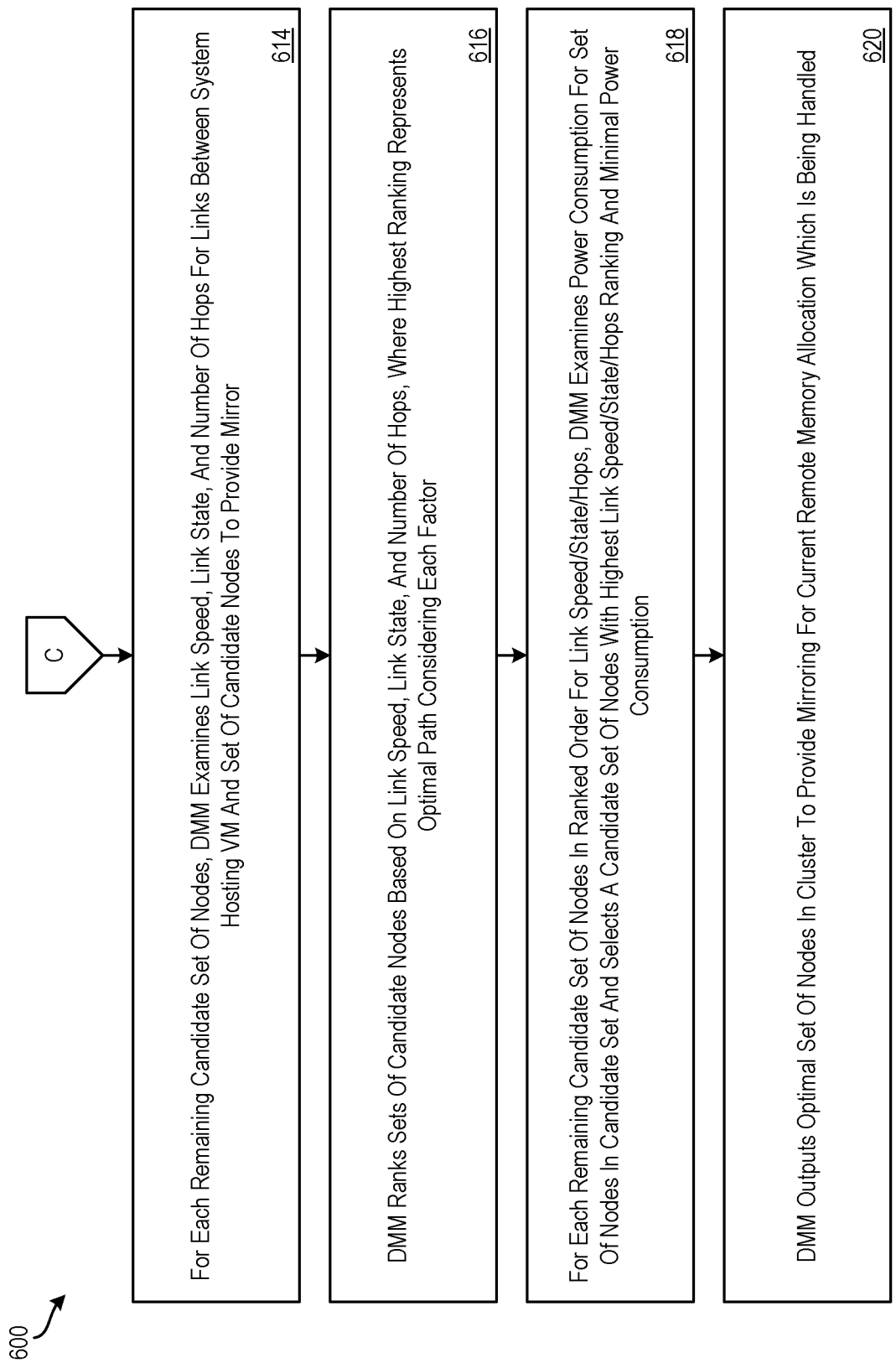

FIGS. 6A-6C together depict a flow diagram of a method 600 for mirrored disaggregated memory in a clustered environment according to one or more embodiments described herein. According to one or more embodiments described herein, the method 600 provides for the DMM 362 to allocate mirrored memory for remote disaggregated memory allocations. The method 600 can be implemented using any suitable system or device, such as the computing environment 100, one or more of the nodes 210-215, and/or the like, including combinations and/or multiples thereof. For example, the method 600 can be implemented using the node 210, including the hypervisor 360, the virtual machine 361, and the DMM 362, as shown in FIG. 3C.

At block 602, the DMM 362 examines available memory capacities of each node (e.g., the nodes 210-213) in the cluster 301 and identifies sets of nodes with sufficient capacity to provide mirroring for the current remote memory allocation which is being handled.

At block 604, it is determined whether the DMM 362 can identify candidate sets of nodes with target node set size with capacity to provide necessary memory for mirroring the current remote memory allocation. If so, the method 600 proceeds to block 606, where it is determined whether the DMM 362 can determine a candidate set of nodes for which each node in set has an independent path from the system hosting the virtual machine 361 to candidate set of nodes versus the current allocation of remote disaggregated memory that is being mirrored. If so, the method 600 proceeds to block 614 (see FIG. 6C).

If either of blocks 604 or 606 is "no," the method 600 proceeds to block 608 (see FIG. 6B). With reference to FIG. 6B, at block 608, the DMM 362 increases the target node set size by "1" for sets of nodes with necessary capacity to mirror current remote memory allocation. At block 610, it is determined whether the target node set size is greater than the total number of remote nodes in the cluster 301. If yes, it is determined that the DMM 362 is unable to determine a sufficient set of mirrored memory for remote disaggregated memory allocation at block 612. However, if it is determined that the target node set size is not greater than the total number of remote nodes in the cluster 301 at block 610, the method 600 proceeds to block 604 (see FIG. 6A).

With reference to FIG. 6C, at block 614, for each remaining candidate set of nodes, the DMM 362 examines link speed, link state, and number of hops for links between the system hosting the virtual machine 361 and the set of candidate nodes to provide the mirror. At block 616, the DMM 362 ranks sets of candidate nodes based on link speed, link state, and number of hops, where the highest ranking represents an optimal path considering each factor (e.g., minimize number of hops to reduce failure points, maximize path link speed for optimal bandwidth, minimize use of links in degraded state or with high rates of errors, and/or the like, including combinations and/or multiples thereof). At block 618, for each remaining candidate set of nodes in ranked order for link speed/state/hops, the DMM 362 examines power consumption for the set of nodes in the candidate set and selects a candidate set of nodes with the highest link speed/state/hops ranking and minimal power consumption. At block 620, the DMM 362 outputs the optimal set of nodes in the cluster 301 to provide mirroring for the current remote memory allocation that is being handled.

Additional processes also may be included, and it should be understood that the process depicted in FIGS. 6A-6C represents an illustration, and that other processes may be added, or existing processes may be removed, modified, or rearranged without departing from the scope of the present disclosure.

Example embodiments of the disclosure include or yield various technical features, technical effects, and/or improvements to technology. Example embodiments of the disclosure provide for mirrored disaggregated memory in a clustered environment by assigning a disaggregated memory to a virtual machine having a remote disaggregated memory and allocating a mirrored memory for the remote disaggregated memory to mirror the remote disaggregated memory on an alternate node of the cluster of the disaggregated memory clustered environment, such as by using a unique physical path to provide redundancy for failure events in the physical path. Such embodiments further provide for maintaining the mirrored memory responsive to memory accesses occurring, modifying memory usage across the cluster responsive to detecting a memory allocation adjustment, and implementing a corrective action responsive to detecting a failure resulting in loss of access to the remote disaggregated memory. These aspects of the disclosure constitute technical features that yield the technical effect of using the unique path and replica of the memory to allow for a failure in a cluster to be tolerated when a failure occurs within the cluster such that the virtual machine's disaggregated memory is no longer available to the virtual machine. This improves processing system functionality by providing preventing catastrophic memory loss and by improving reliability and availability within a disaggregated memory environment without losing the advantages of being able to utilize disaggregated memory. As a result of these technical features and technical effects, a processing system, such as a node or a cluster of nodes in accordance with example embodiments of the disclosure, using the techniques for mirrored disaggregated memory in a clustered environment described herein represents an improvement to existing techniques for memory management in a clustered environment. It should be appreciated that the above examples of technical features, technical effects, and improvements to technology of example embodiments of the disclosure are merely illustrative and not exhaustive.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for mirroring memory in a disaggregated memory clustered environment, the computer-implemented method comprising:
   assigning, by a hypervisor, a disaggregated memory to a virtual machine comprising a remote disaggregated memory, the virtual machine being one node of a cluster of the disaggregated memory clustered environment;
   allocating, by a disaggregated memory manager, a mirrored memory for the remote disaggregated memory to mirror the remote disaggregated memory on an alternate node of the cluster of the disaggregated memory clustered environment, wherein the alternate node is selected from a set of candidate nodes based at least in part on a link speed, a link state, a number of hops for links between a system hosting the virtual machine and the set of candidate nodes to provide the mirror, and power consumption for the set of nodes in the candidate set;
   responsive to a memory access occurring, maintaining, by the disaggregated memory manager, the mirrored memory;
   responsive to detecting a memory allocation adjustment, modifying, by the disaggregated memory manager, memory usage across the cluster; and
   responsive to detecting a failure resulting in loss of access to the remote disaggregated memory, implementing a corrective action.

2. The computer-implemented method of claim 1, wherein the virtual machine further comprises a local memory.

3. The computer-implemented method of claim 1, wherein the alternate node is accessible through an independent path.

4. The computer-implemented method of claim 1, wherein the failure is a loss of access to the remote disaggregated memory, and wherein the corrective action is the disaggregated memory manager responding to the failure within the cluster.

5. The computer-implemented method of claim 1, further comprising:
 detecting a configuration change within the cluster; and
 modifying, by the disaggregated memory manager, memory usage across the cluster.

6. The computer-implemented method of claim 5, wherein the configuration change is an addition of a node from the cluster.

7. The computer-implemented method of claim 5, wherein the configuration change is a removal of a node from the cluster.

8. A system comprising:
 a memory comprising computer readable instructions; and
 a processing device for executing the computer readable instructions, the computer readable instructions controlling the processing device to perform operations for mirroring memory in a disaggregated memory clustered environment, the operations comprising:
  assigning, by a hypervisor, a disaggregated memory to a virtual machine comprising a remote disaggregated memory, the virtual machine being one node of a cluster of the disaggregated memory clustered environment;
  allocating, by a disaggregated memory manager, a mirrored memory for the remote disaggregated memory to mirror the remote disaggregated memory on an alternate node of the cluster of the disaggregated memory clustered environment, wherein the alternate node is selected from a set of candidate nodes based at least in part on a link speed, a link state, a number of hops for links between a system hosting the virtual machine and the set of candidate nodes to provide the mirror, and power consumption for the set of nodes in the candidate set;
  responsive to a memory access occurring, maintaining, by the disaggregated memory manager, the mirrored memory;
  responsive to detecting a memory allocation adjustment, modifying, by the disaggregated memory manager, memory usage across the cluster; and
  responsive to detecting a failure resulting in loss of access to the remote disaggregated memory, implementing a corrective action.

9. The system of claim 8, wherein the virtual machine further comprises a local memory.

10. The system of claim 8, wherein the alternate node is accessible through an independent path.

11. The system of claim 8, wherein the failure is a loss of access to the remote disaggregated memory, and wherein the corrective action is the disaggregated memory manager responding to the failure within the cluster.

12. The system of claim 8, wherein the operations further comprise:
 detecting a configuration change within the cluster; and
 modifying, by the disaggregated memory manager, memory usage across the cluster.

13. The system of claim 12, wherein the configuration change is an addition of a node from the cluster.

14. The system of claim 12, wherein the configuration change is a removal of a node from the cluster.

15. A computer program product comprising a computer readable storage medium having program instructions embodied therewith, the program instructions executable by a processor to cause the processor to perform operations for mirroring memory in a disaggregated memory clustered environment, the operations comprising:
 assigning, by a hypervisor, a disaggregated memory to a virtual machine comprising a remote disaggregated memory, the virtual machine being one node of a cluster of the disaggregated memory clustered environment;
 allocating, by a disaggregated memory manager, a mirrored memory for the remote disaggregated memory to mirror the remote disaggregated memory on an alternate node of the cluster of the disaggregated memory clustered environment, wherein the alternate node is selected from a set of candidate nodes based at least in part on a link speed, a link state, a number of hops for links between a system hosting the virtual machine and the set of candidate nodes to provide the mirror, and power consumption for the set of nodes in the candidate set;
 responsive to a memory access occurring, maintaining, by the disaggregated memory manager, the mirrored memory;
 responsive to detecting a memory allocation adjustment, modifying, by the disaggregated memory manager, memory usage across the cluster; and
 responsive to detecting a failure resulting in loss of access to the remote disaggregated memory, implementing a corrective action.

16. The computer program product of claim 15, wherein the virtual machine further comprises a local memory.

17. The computer program product of claim 15, wherein the alternate node is accessible through an independent path.

18. The computer program product of claim 15, wherein the failure is a loss of access to the remote disaggregated memory, and wherein the corrective action is the disaggregated memory manager responding to the failure within the cluster.

19. The computer program product of claim 15, wherein the operations further comprise:
 detecting a configuration change within the cluster; and
 modifying, by the disaggregated memory manager, memory usage across the cluster.

20. The computer program product of claim 19, wherein the configuration change is an addition of a node from the cluster.

21. The computer program product of claim 19, wherein the configuration change is a removal of a node from the cluster.

22. A computer-implemented method for mirroring memory in a disaggregated memory clustered environment, the computer-implemented method comprising:
 assigning, by a hypervisor, a disaggregated memory to a virtual machine of a cluster;
 allocating, by a disaggregated memory manager, a mirrored memory for remote disaggregated memory allocations to mirror the disaggregated memory on an alternate node of a cluster of the disaggregated memory clustered environment, wherein the alternate node is selected from a set of candidate nodes based at least in part on a link speed, a link state, a number of hops for links between a system hosting the virtual machine and the set of candidate nodes to provide the mirror, and power consumption for the set of nodes in the candidate set;

maintaining, by the disaggregated memory manager, the mirrored memory as memory accesses occur;

responsive to memory allocation adjustments, adjusting, by the disaggregated memory manager, the allocations to maintain mirroring;

responsive to changes to the cluster, determining, by the disaggregated memory manager, whether allocation changes are to be made for improved performance and resiliency and adjusting the allocations accordingly;

determining whether a failure occurs in a primary node of the disaggregated memory; and responsive to determining that the failure occurred in the primary node, switching to using a secondary node as a primary memory source and re-establishing an alternate secondary node for the mirrored memory.

23. The computer-implemented method of claim 22, further comprising:

responsive to determining that no failure occurred in the primary node, determining whether a failure occurs in the secondary node of the disaggregated memory; and responsive to determining that the failure occurred in the secondary node, re-establishing another alternate secondary node for the mirrored memory.

24. A system comprising:

a memory comprising computer readable instructions; and a processing device for executing the computer readable instructions, the computer readable instructions controlling the processing device to perform operations for mirroring memory in a disaggregated memory clustered environment, the operations comprising:

assigning, by a hypervisor, a disaggregated memory to a virtual machine of a cluster;

allocating, by a disaggregated memory manager, a mirrored memory for remote disaggregated memory allocations to mirror the disaggregated memory on an alternate node of a cluster of the disaggregated memory clustered environment, wherein the alternate node is selected from a set of candidate nodes based at least in part on a link speed, a link state, a number of hops for links between a system hosting the virtual machine and the set of candidate nodes to provide the mirror, and power consumption for the set of nodes in the candidate set;

maintaining, by the disaggregated memory manager, the mirrored memory as memory accesses occur;

responsive to memory allocation adjustments, adjusting, by the disaggregated memory manager, the allocations to maintain mirroring;

responsive to changes to the cluster, determining, by the disaggregated memory manager, whether allocation changes are to be made for improved performance and resiliency and adjusting the allocations accordingly;

determining whether a failure occurs in a primary node of the disaggregated memory; and responsive to determining that the failure occurred in the primary node, switching to using a secondary node as a primary memory source and re-establishing an alternate secondary node for the mirrored memory.

25. The system of claim 24, wherein the operations further comprise:

responsive to determining that no failure occurred in the primary node, determining whether a failure occurs in the secondary node of the disaggregated memory; and responsive to determining that the failure occurred in the secondary node, re-establishing another alternate secondary node for the mirrored memory.

* * * * *